INVENTOR.
MALCOLM W. LOVELAND

Oct. 21, 1969  M. W. LOVELAND  3,473,588
METHOD AND MEANS FOR PEELING PINEAPPLES
Filed Jan. 30, 1967  4 Sheets-Sheet 2

INVENTOR.
MALCOLM W. LOVELAND
BY
*Berhoff & Slick*
ATTORNEYS

Oct. 21, 1969    M. W. LOVELAND    3,473,588
METHOD AND MEANS FOR PEELING PINEAPPLES
Filed Jan. 30, 1967    4 Sheets-Sheet 3
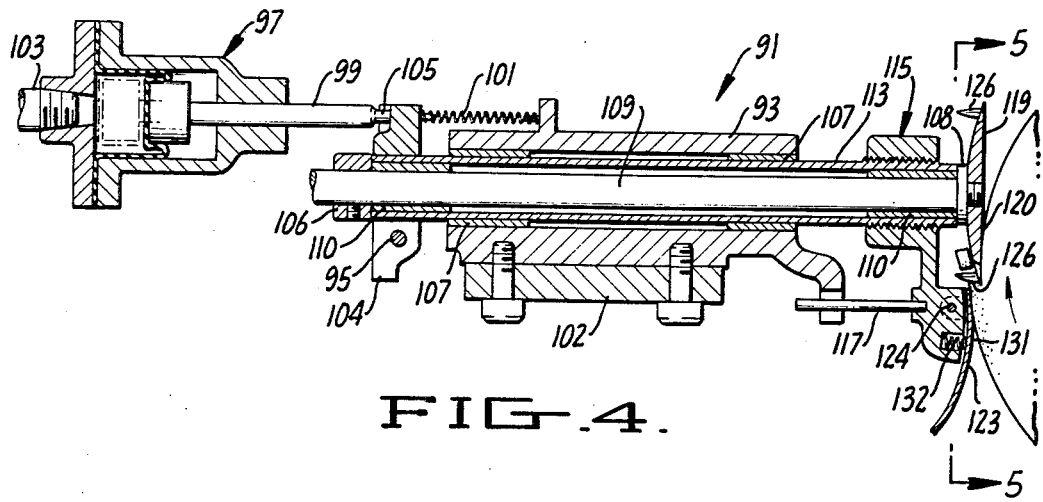
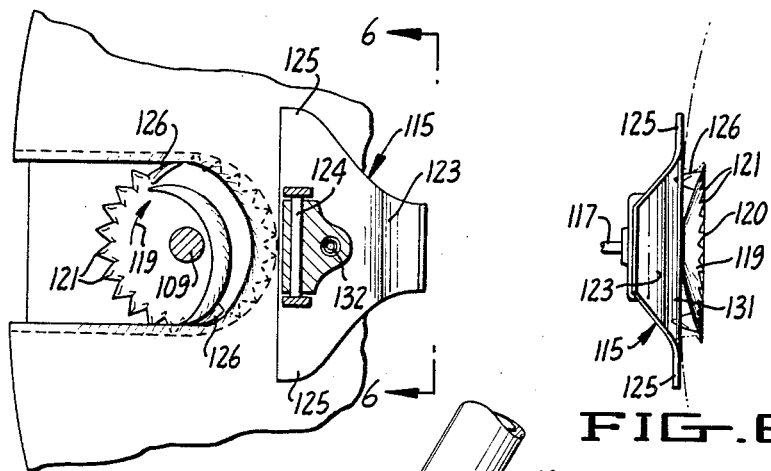
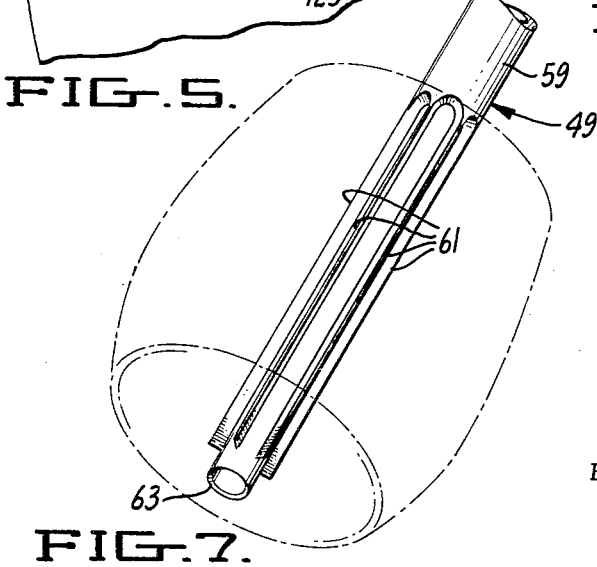
INVENTOR.
MALCOLM W. LOVELAND
BY
ATTORNEYS

INVENTOR.
MALCOLM W. LOVELAND
BY
ATTORNEYS

United States Patent Office 3,473,588
Patented Oct. 21, 1969

3,473,588
METHOD AND MEANS FOR PEELING PINEAPPLES
Malcolm W. Loveland, Orinda, Calif., assignor, by mesne assignments, to Atlas Pacific Engineering Company, Emeryville, Calif., a corporation of Delaware
Filed Jan. 30, 1967, Ser. No. 612,584
Int. Cl. A01f *29/00;* A23l *1/00*
U.S. Cl. 146—241                    7 Claims

ABSTRACT OF THE DISCLOSURE

The method of preparing a pineapple wherein the pineapple is rotated at consecutive peeling stations, stationary peeling cutters at one station removing spaced annular strips of peel and stationary peeling cutters at another station removing the strips of peel remaining after the first peeling cuts.

FIELD OF THE INVENTION

Preparing pineapples for canning by a series of cutting, coring and peeling steps.

DESCRIPTION OF THE PRIOR ART

Pineapples are prepared for canning by first cutting off the opposite ends, the butt end and the leafy crown end. The pineapples are then fed to a machine which makes two cuts on the fruit. One comprises a first cut to remove the most of the outside and reduce the pineapple to a predetermined cylindrical size. The second cut removes the woodlike core and what remains is a hollow cylinder with the skin and eyes removed to a greater or less extent. In the interest of economy, the outer cylindrical cut is made of as large a diameter as possible. As a result, in the great bulk of the fruit, the eyes on the fruit are not removed at each end. This is because pineapples are ovoidal in shape with eyes extending about ⅜" deep, and if the fruit were cut to the smallest diameter, the waste would be too great. The machine on which these cylindrical cutting operations are performed is well known in the art and is commonly referred to as a "Ginaca"; see Patents 1,039,926, 1,060,247, 1,060,248, 1,060,249, 1,060,250, 1,060,750, 1,065,309, 1,075,031, and 1,112,130.

The cutting of the pineapples on a Ginaca is subject to several objections. One is that any eyes remaining on the outer surface at both ends must be removed by hand trimming. This is a time consuming and an expensive operation. Another objection is the loss of good pineapple meat on the ovoidal shell cut from the fruit. Because so many eyes are present in any meat extracted from the shell, the only practical use to which this can be put is to press it to release the juice and recover this by filtration. The saleability of the juice is only at a low price and it moves slowly in the market place. Finally, the Ginaca machine is only useful on the large fruit.

SUMMARY

It is therefore an object of the present invention to provide a method of preparing pineapple wherein the maximum amount of the pineapple is recovered in such a form that it can be used as either sliced, chunk or crushed pineapple suitable for canning, and wherein a minimum amount of pineapple is used for juice or cattle feed.

Another object of this invention is to provide a method which is largely automatic in its operation and performed by machines so that little or no hand labor is required to remove the eyes from the finished product.

Still another object of this invention is to provide a method of processing pineapples which is largely automatic in its operation yet uses a relatively simple and foolproof mechanism.

A still further object of the present invention is to provide a method of more readily processing both large and small pineapples into usable fruit by simple machine adjustments which can be made quite readily.

A further object of the present invention is to provide a novel form of mechanism for enabling a pineapple to be prepared for canning with the maximum economic utilization of its by-products.

The invention includes other objects and features of advantage some of which, together with the foregoing, will appear hereinafter wherein the present preferred manner of carrying out the method of this invention and the mechanisms useful therefor are disclosed.

A BRIEF DESCRIPTION OF THE DRAWINGS

In the drawings accompanying and forming a part of this specification:

FIGURE 4 is an enlarged sectional view of one form of cutting head which could be used in carrying out the present invention;

FIGURE 5 is an end view generally on the line 5—5 of FIGURE 4 but showing the blade rotated 90° from the position shown in FIGURE 4;

FIGURE 6 is a section through the cutting mechanism on the line 6—6 of FIGURE 5;

FIGURE 7 is a perspective view of a pineapple showing one form of a spindle which may be utilized during the peeling operation;

DESCRIPTION OF THE PREFERRED EMBODIMENTS

Figure 1:
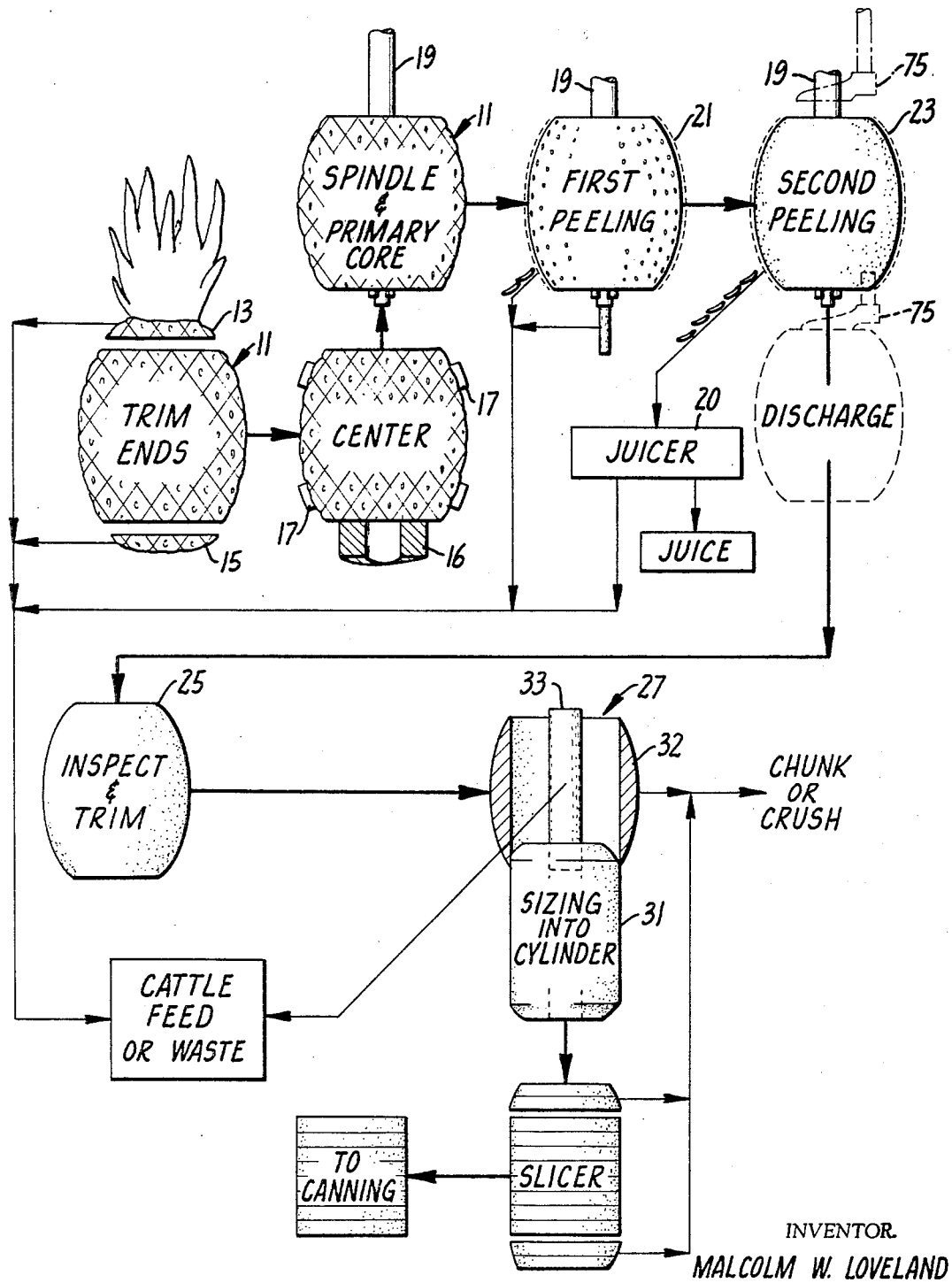
FIGURE 1 is a diagrammatic view illustrating a method embodying the present invention.

Referring now to the drawings by reference characters, and particularly to the extreme lefthand representation in FIGURE 1, there is shown a pineapple, generally designated 11, on which the first operation has been performed by a separate machine. This comprises cutting off the top 13 and bottom 15 which parts contain little pineapple meat and which are sent to cattle feed or waste. The pineapple is then fed into the machine in which centering elements 17 center the pineapple. Pusher element 16 forces the centered fruit upward onto a hollow finned spindle 19 which cuts an undersize core hole through the pineapple. Thereafter the pineapple is passed through a first zone wherein it is given a first peeling as at 21 and the primary core is ejected. The first peeling 21 takes off a rough cut about ⅜₁₆" deep, the skin and most of the rough outside portion of the pineapple being removed with a minimum of the fruit. This rough material may have the juice extracted or be used as cattle feed or sent to waste.

At this stage, the pineapple still has part of the indentations of the eyes. The pineapple is then passed through a second zone where it is given a second peeling 23 also about ⅜₁₆" deep. This removes substantially all the eyes and imperfections, leaving the pineapple substantially ready for canning or other further processing. The pineapple is forced off the coring spindle 19 by presser foot 75 and is sent to an inspection station 25. The material removed by the second peel is sent to a juicer 20, the juice being recovered and the solid sent to waste or cattle feed. The pineapple is inspected at station 25, and if a small amount of hand trimming is necessary it may be done at this station.

The pineapple is now passed to station 27 where it is sized into a cylinder and the primary core hole enlarged to full size. The hollow cylinder 31 is subject to further operations such as slicing. The outer annular portion 32 which has been cut off is sent to further operations for producing crushed or chunk pineapple, while the hollow cylindrical secondary core 33 is sent to cattle feed or to waste. This more advantageous economic use is possible because the outer annular portion 32 is free from imperfections, as contrasted with the annular portion left after the operation of the Ginaca machine, which portion is only suitable for juice or cattle feed. It is believed apparent from the above generalized description that the method of the present invention produces the greatest amount of usable pineapple and the minimum amount of cattle feed and juice and this with a minimum amount of hand labor.

Figure 2:
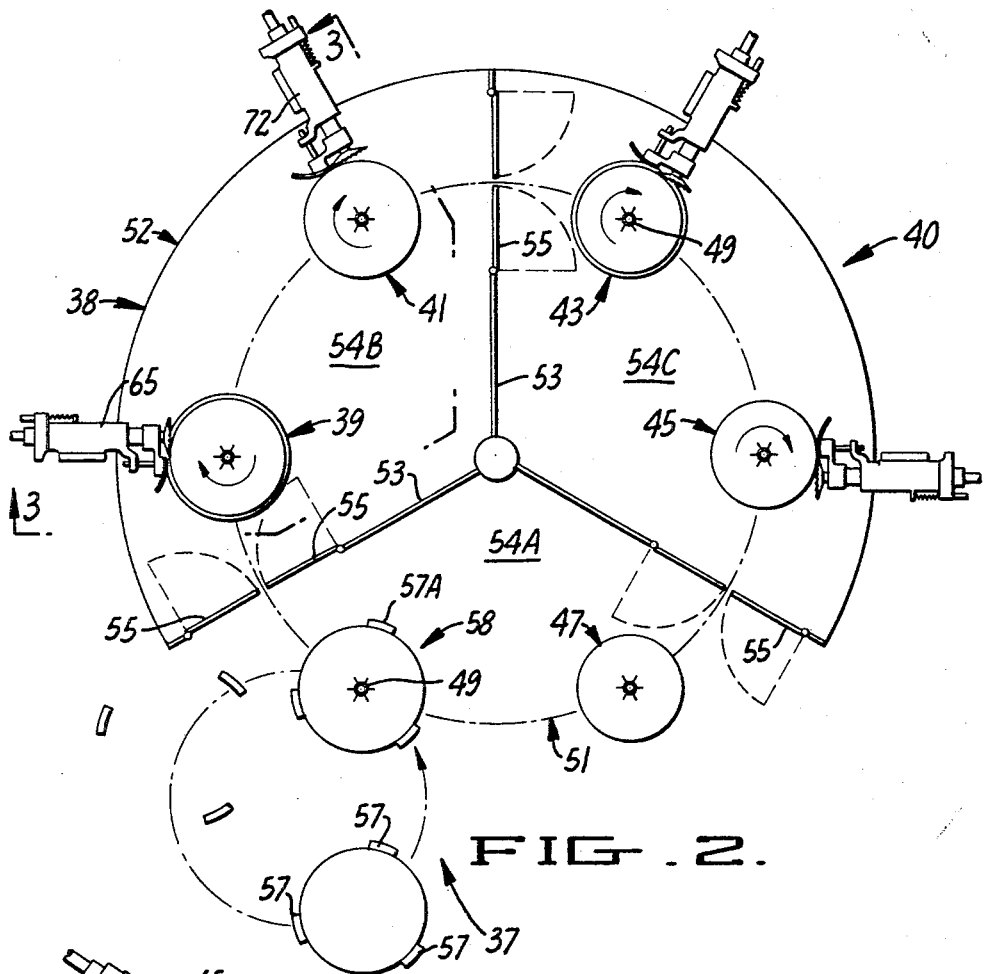
FIGURE 2 is a plan view of one form of apparatus which can be used in carrying out the present invention.

In FIGURE 2 there is shown one form of apparatus for performing the method of the present invention. The machine illustrated has six spindles which are moved stepwise from one station to the next. These include a loading station 37, a rough peeling station 38 having two peeling locations 39 and 41, a finish peeling station 40 having two peeling locations 43 and 45, and an unloading station 47. The six spindles 49 are advanced from one station to the next under control of an index mechanism which is not shown but which is well known in the art. The spindles 49 make one revolution in each peeling location before moving to the next; the spindles are not rotated at the loading and unloading stations 37 and 47.

The spindles 49 depend from a rotating disc or table 51 above a chute structure 52. The chute structure is divided into three separate compartments 54A, B and C by the partitions 53 so that each operation is conducted in a separate compartment to enable the several by-products to be kept separate from one another. The partitions 53 have swinging doors 55 to permit the pineapples to pass from one station to the next. Suitably, the doors 55 may be merely spring loaded and are pushed open by the pineapples as they move from one station to the next or they may be positively power actuated.

At the loading station 37, a plurality of spring loaded centering fingers 57 are provided to grasp and center a pineapple which has been fed by hand or by machine with its core axis vertical. The clamps then move in time with the disc 51 from loading station 37 to the station designated 58. At station 58 the pineapple is directly under a spindle 49. In position 58, the pineapple is pushed upwardly through fingers 57 and is impaled on the spindle 49 until its median plane is substantially in the plane of the middle peeling unit 67 as in FIGURE 3. Fingers 57 and spindle 49 correspond respectively to the centering elements 17 and the spindle 19 described in the operation set forth in connection with FIGURE 1.

A suitable form of spindle 49 is shown in enlarged form in FIGURE 7. The spindle comprises a hollow shaft 59 with a series of flutes or fins 61 thereon and having a sharpened end 63. As the pineapple is impaled on the spindle, the sharpened end cuts an undersize primary core which is thereafter ejected in the first peeling compartment 54B. The outside diameter of the flutes 61 is somewhat smaller than the ultimate core of the pineapple to be removed in a later operation, so no usable portion of the pineapple is harmed by impalement on the spindle.

Figure 3:
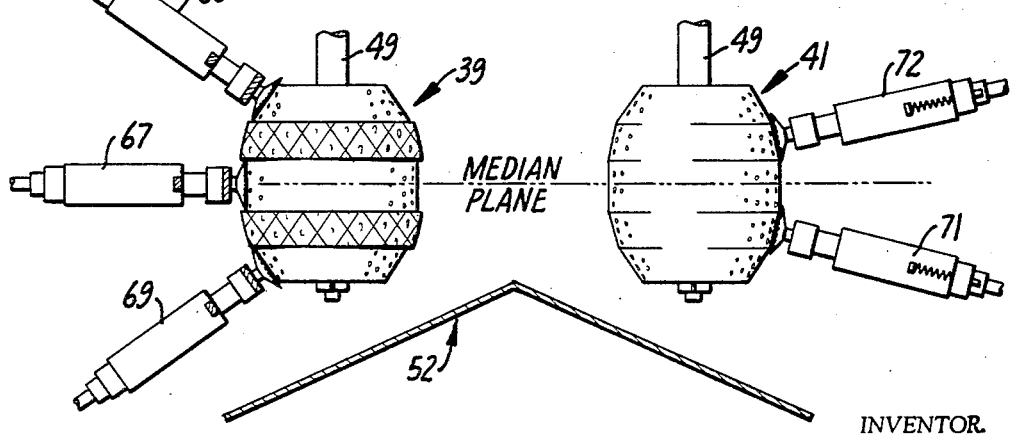
FIGURE 3 is a side view on the line 3—3 of FIGURE 2.

After the pineapple has been impaled on a spindle, it is moved through the series of stations (clockwise in the embodiment illustrated) by a suitable indexing mechanism. The first of these is station 38 having peeling locations 39 and 41 at each of which the pineapple makes one revolution while undergoing peeling. Locations 39 and 41 are rough skin peeling locations at which the the first rough peeling previously described is made in two stages. As is shown in FIGURE 3, cutter heads 65, 67 and 69 operate at station 39 while cutter heads 71 and 72 operate at station 41. The cutter structures will be hereinafter described in detail but at this point it will suffice to say that the three cutter heads 65, 67 and 69 make a top, central and bottom cut respectively leaving two bands of uncut skin while cutter heads 71 and 72 thereafter remove the two theretofore uncut bands. This initial cut penetrates about $3/16''$ and removes substantially all skin and a greater portion of the eyes. The cut material is collected by the chute 52 and ordinarily is used for cattle feed or sent to waste.

After cutting at the two locations 39 and 41, the pineapple passes to station 43 and then to station 45 where another cut is taken off at each stage to provide the second finish peeling previously described, again in two stages. The cuts at this station are again made in bands as at the previous station and as is shown in FIGURE 3. This finished cut is also about $3/16''$ deep and, since a considerable amount of flesh is taken on the second cutting, this material can be collected and used for juice. At this point, the pineapple still has the characteristic pineapple shape but is free of all skin and all but unusually deep eyes.

In the above, it has been assumed that two cuts, first one with three cutters and the second with two cutters, would provide both the rough and finish cuts, but it will be apparent that this is for illustration purposes only and that other numbers of cutting heads might be employed. Ordinarily five heads would be about a minimum and larger pineapples might require more cutting heads for operation at any one time.

Figure 8:
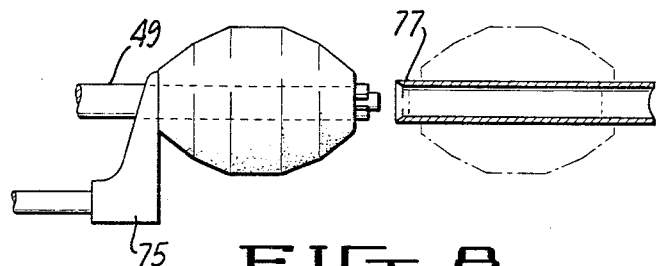
FIGURE 8 is a diagrammatic view showing the method of removing the pineapple from the peeling spindle and forcing it onto a coring tube.

After the two series of cutting operations, the pineapple then passes to station 47. The operation at this station may include a further secondary coring and in any case the pineapple is finally discharged at this station. The secondary coring operation is shown in diagrammatic form in FIGURE 8. Here the pineapple is shown impaled on the spindle 49 and a presser foot 75 is employed to press the pineapple off of the spindle 49. The pineapple may be discharged from the machine or pressed onto a coring tube 77 and thus into the position shown in broken lines to the right of FIGURE 8. It will be seen that the end of the coring tube 77 has a sharpened end and cuts out a core which is larger in diameter than the flutes on the spindle 49 and fully encompasses the central core fiber of the fruit. The fully cored and peeled fruit is then moved off the core tube 77 and the core ejected by a separate mechanism not shown.

Figure 9:
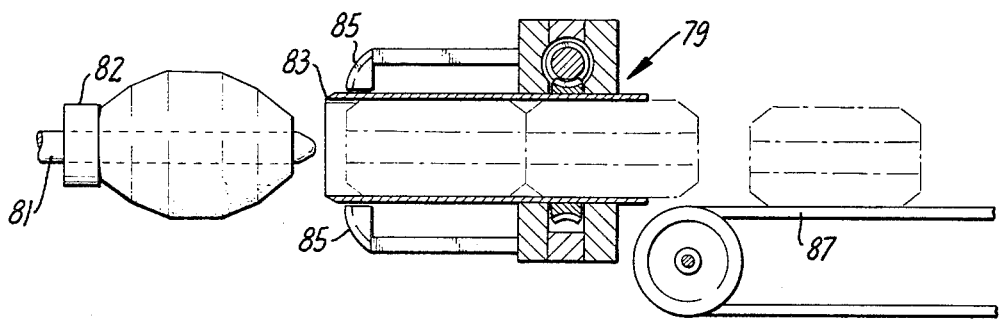
FIGURE 9 is a side view of the method of cutting the pineapple to size preparatory to canning.

The peeled and fully or partially cored fruit is delivered to an inspection station whereat any hand trimming required is provided. The inspected and trimmed fruit is then passed to a sizing machine, generally designated 79, FIGURE 9. The pineapple is placed on and is carried by a rod 81 which fits in the core hole in the fruit. Pusher element 82 is slidable on rod 81 and serves to force the fruit into the sharpened cylinder 83 which may be rotating. This cuts the fruit into a cylinder which is the size of the can in which the fruit is to be packaged. If the fruit was not fully cored as it was discharged from the peeling machine, an internal cylindrical cut can be made simultaneously with the external cylindrical cut. Methods for cutting both the external and internal cylindrical cuts are well known in the art. In addition, radial blades 85 may be employed to sever the annular portion into two or more segments for easier handling. The pineapple then passes onto a conveyor 87 to be sliced or otherwise processed.

Figure 10:
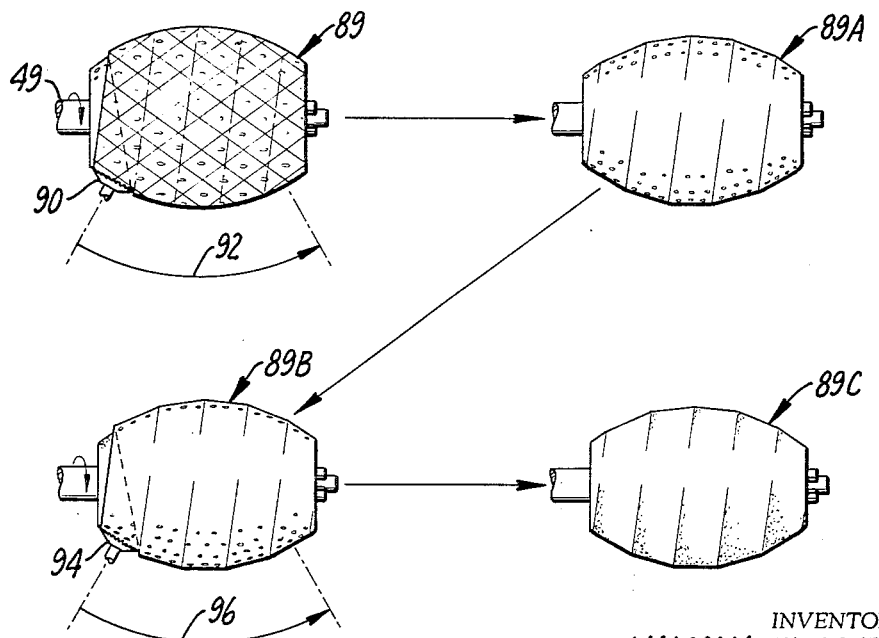
FIGURE 10 is a diagrammatic view showing a method of spiral peeling which forms another embodiment of the present invention.

In FIGURE 10 an alternate embodiment of the invention is shown. Here a pineapple 89 is held on a rotating spindle 49 and a first cutting head 90 is moved through an arc 92 to perform the initial cutting operation. Thus, the pineapple shown at 89A has a spiral cut thereon and has been peeled to remove the rough skin. The pineapple then passes to the position shown at 89B whereupon a second cutting head 94 makes a second pass through the arc 96 completing the peeling operation, producing the pineapple shown at 89C and which has substantially all of its eyes removed and which is in substantially the same condition the pineapple processed in accordance with the first described embodiment. The peeling heads 90 and 94 may be at separate stations or may be the same head making a forward and return cut each about $3/16''$ deep. By utilizing two peeling operations at different stations, the cuttings can be collected separately and used to their greatest economic advantage.

In FIGURES 4 through 6, one of the cutting heads is illustrated. The cutter head has generally been designated 91 and comprises a body 93 adjustably mounted on a bracket 102 so that the base of a rotary cutter 119 will be substantially tangent to the outer surface of a pineapple and its cutting edge substantially on the centerline of the pineapple. Within body 93, sleeve 113 is slidably mounted in bushings 107. A split collar 104, clamped on the end of sleeve 113, has one or more slots 105 in its outer face. Piston shaft 99 engages one of the slots 105 to prevent rotation of the collar and its attached sleeve 113. The piston and cylinder assembly 97 is supplied with a regulated and controlled air pressure to urge the sleeve 113 and shaft assembly toward the fruit with a steady pressure when air pressure is applied. When the air is not applied, spring 101 retracts the assembly from the fruit. The on-off sequence is controlled by an automatic valve, not shown, which relates the application of air to the revolution of the fruit. By retracting the piston rod 99 from one of slots 105, the sleeve 113 may be rotated to cause the guard assembly, generally indicated at 115, to advance toward or recede from the end of the sleeve 113, thus controlling the depth of cut. Reengagement of piston rod 99 and a slot 105 prevents further rotation of sleeve 113. Shaft 109 is mounted for rotation within sleeve 113 on bushings 110. The shaft 109 is prevented from moving axially within sleeve 113 by collar 106 and flange 108. Shaft 109 is rotated by a suitable drive such as a flexible shaft, not illustrated.

The guard assembly 115 is threaded onto sleeve 113 and is prevented from rotating by pin 117 slidably engaged with body 93. Mounted on shaft 109 is cutter 119, which has a series of sawlike teeth 121. Face 120 on the cutter 119 in contact with the fruit is smooth so that it cannot cut into the fruit axially when it is rotated. The teeth 121 are sharpened on the face opposite the face 120. In addition to the teeth 121, projections 126 are provided on the opposite side of face 120. The saw teeth sever the fibers of the pineapple and lift a ribbon of peel while the projections 126 which are sharpened on their leading edge cut the ribbon or peel into segments about $1/4''$ long depending on the speed of cutter and pineapple rotation.

The guard member 115 carries a depth gage 123 which regulates the depth of the cut. The gage includes a foot 131 pivoted at 124 and pressed by spring 132 to engage the fruit. The foot 131 projects forwardly beyond the path of the cutter. This action can best be seen in FIGURE 4. Further, as is shown in FIGURE 5, the gage 123 may have wings 125 on either side and which ride on the uncut portion of the pineapple as is best seen in FIGURES 5 and 6. These wings are particularly valuable when making the first cut of a series such as at stations 39 and 43. In making the second cut, as at stations 41 and 45, the guard rides over the uncut surface to regulate the depth of cut, as is best seen in FIGURE 4.

Although certain specific methods and equipment have been illustrated, it will be understood that these are for purposes of illustration only and that many variations can be made in the method and apparatus without departing from the spirit of this invention. For instance, in FIGURE 2 it is shown that the cutters are stationary and that the spindles rotate in a fixed position in front of the stationary cutters. However, it could easily be arranged so that the cutters would move along from one station to the next with the spindles 49. This would be particularly valuable in carrying out the embodiment shown in FIGURE 10 wherein two spiral cuts can be made with a single cutter rather than with two cutters as described above. Further, it has been shown in FIGURE 2 that two separate stations are used for the initial peeling cut and two more stations for the finished cut. It is obvious that the entire cutting operation could be done at two stations or even a single station. Instead of cutting the peeling and the remainder of the eyes in separate operations, a single cut about $3/8''$ deep can be made. Such a single cut can be made either in bands, as shown in FIGURE 3, or as a spiral, as is shown in FIGURE 10.

I claim:
1. The method of preparing a pineapple comprising:
  (a) rotating the fruit at a first position at a first peeling station through substantially one complete turn;
  (b) making a first series of spaced annular cuts on the surface of the rotating fruit at such first position at the first peeling station with spaced cutters;
  (c) moving the fruit to a second position at the first peeling station;
  (d) rotating the fruit at a second position at a second peeling station through substantially one complete turn;
  (e) making a second series of spaced annular cuts on the surface of the rotating fruit at such second position at the first peeling station with spaced cutters to remove uncut material remaining after the first series of annular cuts;
  (f) then moving the fruit to a first position at a second peeling station;
  (g) rotating the fruit at such first position at the second peeling station through substantially one complete turn;
  (h) making a third series of spaced annular cuts on the surface of the rotating fruit at such first position at the second peeling station with spaced cutters;
  (i) moving the fruit to a second position at the second peeling station;
  (j) rotating the fruit at such a second position at the second peeling station through substantially one complete turn;
  (k) and finally making a fourth series of annular cuts on the surface of the rotating fruit at such second position at the second peeling station with spaced cutters to remove material remaining after the third series of cuts.
2. The method as in claim 1 wherein each cutter makes a cut in the rotating fruit in a plane substantially parallel to the plane of the tangent to the outer surface of the pineapple adjacent to the cutter.
3. The method of claim 1 wherein the material cut from the fruit at the first station is collected as a first lot and the material cut from the fruit at the second station is collected as a second lot separate from the first lot.
4. The method of claim 1 wherein each cut is of a depth approximating $3/16''$.
5. The method of preparing a pineapple comprising:
  (a) rotating the fruit at a first peeling station through substantially one complete turn;
  (b) making a first series of spaced annular cuts on the surface of the rotating fruit at such first peeling station with spaced cutters;
  (c) moving the fruit to a second peeling station;
  (d) rotating the fruit at the second peeling station through substantially one complete turn; and
  (e) making a second series of spaced annular cuts on the surface of the rotating fruit at such second peeling station with spaced cutters to remove uncut material remaining after the first series of annular cuts.

6. The method of preparing a pineapple comprising:
(a) centering a pineapple by engaging its outer surface at spaced points;
(b) engaging a hollow spindle with the centered pineapple along substantially its major axis to impale the pineapple and cut a core therein;
(c) rotating the spindle to rotate the fruit at a first peeling station through substantially one complete turn;
(d) making a first series of spaced annular cuts on the surface of the rotating fruit at such first peeling station with spaced cutters;
(e) moving the spindle carrying the fruit to a second peeling station;
(f) rotating the spindle to rotate the fruit at the second peeling station through substantially one complete turn;
(g) making a second series of spaced annular cuts on the surface of the rotating fruit at such second peeling station with spaced cutters to remove uncut material remaining after the first series of annular cuts;
(h) and finally withdrawing the peeled fruit from the spindle.

7. The method as in claim 6 wherein each cutter makes a cut in the rotating fruit in a plane substantially parallel to the plane of the tangent to the outer surface of the pineapple adjacent to the cutter.

References Cited

UNITED STATES PATENTS

| | | | |
|---|---|---|---|
| 1,590,162 | 6/1926 | Hargreaves | 146—6 |
| 1,984,709 | 12/1934 | Taylor | 146—6 |
| 2,034,160 | 3/1936 | Taylor | 146—6 X |
| 2,361,241 | 10/1944 | Rogers | 146—37 X |
| 3,036,920 | 5/1962 | Farmer | 146—241 X |
| 3,352,337 | 11/1967 | Vadas | 146—6 |
| 3,382,900 | 5/1968 | De Back | 146—6 |

W. GRAYDON ABERCROMBIE, Primary Examiner

U.S. Cl. X.R.

146—6